United States Patent [19]
Ditzig et al.

[11] Patent Number: 5,954,197
[45] Date of Patent: *Sep. 21, 1999

[54] STORAGE CASE FOR COMPACT DISCS

[75] Inventors: Albert Ditzig, Hoffmann Estates; Patrick B. Sandell, Barrington, both of Ill.

[73] Assignee: Opticord, Inc., Palatine, Ill.

[*] Notice: This patent is subject to a terminal disclaimer.

[21] Appl. No.: 08/767,177

[22] Filed: Dec. 16, 1996

Related U.S. Application Data

[63] Continuation-in-part of application No. 08/629,054, Apr. 8, 1996, abandoned, which is a continuation of application No. 08/503,010, Jul. 17, 1995, Pat. No. 5,505,299.

[51] Int. Cl.[6] .................................................. B65D 85/672
[52] U.S. Cl. ...................... 206/308.1; 206/486; 206/493
[58] Field of Search ................... 206/308.1, 1.5, 206/815, 309, 310, 311, 312, 313, 486, 493

[56] References Cited

U.S. PATENT DOCUMENTS

| | | | |
|---|---|---|---|
| 4,463,849 | 8/1984 | Prusak et al. | 206/309 X |
| 4,738,361 | 4/1988 | Ackeret | 206/308.1 X |
| 5,334,904 | 8/1994 | Kramer | 206/308.1 X |
| 5,505,299 | 4/1996 | Ditzig et al. | 206/308.1 |

*Primary Examiner*—Jacob K. Ackun
*Attorney, Agent, or Firm*—Leydig, Voit & Mayer, Ltd.

[57] ABSTRACT

A storage case for a compact optical disc retains trays for the disc in a spring loaded arrangement that is released by a latch mechanism easily activated using one hand. The case is formed by top and bottom portions of alternative configurations. A storage system is provided for storing and displaying the trays. The storage system has a base, and rails which engage slots in the tray. A shipping container is provided for shipping either the tray or the individual compact disc.

11 Claims, 10 Drawing Sheets

STORAGE CASE FOR COMPACT DISCS

RELATED APPLICATIONS

This is a continuation in part of application Ser. No. 08/629,054, filed Apr. 8, 1996, and now abandoned, which is a continuation of Ser. No. 08/503,010, filed on Jul. 17, 1995 issued Apr. 9, 1996 as U.S. Pat. No. 5,505,299.

FIELD OF THE INVENTION

The present invention relates generally to storage devices, and more particularly to a modular storage device for compact optical discs.

BACKGROUND OF THE INVENTION

Compact optical discs (CDs) have been available for some time for recording digitally encoded audio program material such as music. More recently, compact optical discs have experienced widespread use as a kind of read-only memory (ROM) for mass storage of alphanumeric data for personal computers.

Historically, compact discs for audio program material typically have been stored in box-like plastic containers, and when it is desired to use the discs, they are removed from the containers and inserted directly into optical laser readers. In the past, however, when used for mass data storage, the compact discs were usually enclosed with cartridges to prevent the discs from being nicked or scratched during handling. Such cartridges typically have sliding doors opened by actuator arms after the cartridges are inserted into the optical readers. An example of such cartridges can be found in U.S. Pat. No. 4,908,817 to Sandell.

Recently, personal computers have added optical laser readers in order to take advantage of the high-density storage feature offered by compact optical discs. These laser readers for personal computers are similar to the optical laser readers used to read audio program material from compact discs in that the discs are inserted directly into the readers. These compact discs for use with personal computers are typically sold and contained in the same type of case used for compact discs for music recording—i.e., a light weight-clear plastic container commonly known as a "jewel box." Unlike compact discs in cartridge containers, the compact discs in jewel boxes are removed from the box and directly inserted into the optical laser reader.

These conventional jewel boxes for compact discs are fragile and subject to breakage. Moreover, these cases are difficult to handle. For example, it usually requires two hands to open the box, which comprises a pair of pivotal top and bottom sections within which the disc is contained. This not only is cumbersome, but dangerous, if for example being done while driving a car as can frequently be the case for compact discs containing audio programming material.

With the increasing popularity of optical laser readers for both home audio and computer systems, the storage of a collection of discs has become a commonplace problem. The jewel boxes typically contain a single compact disc and are relatively bulky to store. Because access to a compact disc is by way of a pivotal lid, a disc cannot be retrieved when it is stacked under other jewel boxes. The box must be removed from the stack in order to access the disc inside, which may easily topple the stack without some type of additional structure to provide lateral support.

Also, the increasing popularity of compact discs for home use has created a substantial rental market for the discs. Because of their fragile nature, jewel boxes are not amenable to the rough handling that inherently occurs when compact discs are circulated in a rental market.

SUMMARY OF THE INVENTION

It is an object of the present invention to provide a storage case for optical compact discs and the like that permit easier access to the discs than has thus far been available.

Another object of the invention is to provide a storage case for compact discs as characterized above that enables a user to easily obtain access to a disc and remove it with one hand, such as while driving.

A further object of the invention is to provide a storage case of the above kind that has a thinner profile than a conventional jewel box, and therefore, is capable of more compact storage.

Still another object of the invention is to provide a storage case for a compact disc that permits removal of the disc without requiring the opening of a lid as is required with the conventional jewel box.

A further object of the invention is to provide a storage case for compact discs that has the foregoing characteristics, is relatively inexpensive in design and manufacture, but is robust and less susceptible to breakage during usage than conventional jewel boxes.

Yet another object of the invention is to provide a storage case of the foregoing type that contains a plurality of compact discs and permits easy selective access to and removal of individual discs using one hand.

A related object of the invention is to provide a storage case for discs that can be stacked with other similar storage cases to provide a compact storage arrangement for a large number of discs, such that any one of the discs can be accessed using one hand and without disassembling the stack.

Yet another object of the invention is to provide a storage case that has a tray for holding compact optical discs that can also be used in other storage and shipping arrangements.

A further object of the invention is to provide a shipping container for the storage case trays that is robust and which protects the trays from damage during shipping.

Still another object of the invention is to provide a shipping container that accepts a plurality of storage case trays that is relatively inexpensive in design and manufacture.

A further object of the invention is to provide an alternative storage system for the storage case trays that permits rapid visual review and physical selection of the tray.

BRIEF DESCRIPTION OF THE DRAWINGS

Other objects and advantages of the present invention will be apparent upon reading the following detailed description and upon reference to the drawings in which.

While the invention will be described in connection with certain preferred embodiments, it will be understood that it is not intended to limit the invention to the embodiments shown but, on the contrary, the intention is to cover the various alternative and equivalent construction included within the spirit and scope of the appended claims.

DETAILED DESCRIPTION OF THE PREFERRED EMBODIMENT

Turning now to the drawings and referring first to FIGS. 1–9, there is shown a storage case for an optical disc generally designated 20 according to the present invention. The storage case 20 according to the invention comprises a molded plastic body 25 having a plurality of individual, low-profile disc supporting trays 22, each adapted to support a compact optical disc 26 for movement between a retracted or stored position within the case 20 (solid line in FIG. 8) and an extended position that allows free access (phantom line of FIG. 8) to the disc. Each of the trays 22 has a thin profile that is a compromise between an approximation of the profile of the disc 26 and a thickness sufficient to ensure structural integrity of the tray. This thin profile permits the body 25 to contain a plurality of trays 22 and thus store a plurality of discs 26 in a comparatively compact and space efficient manner. As described hereinafter, the storage case 20 provides convenient and compact storage for several compact discs, while also providing easy removal of the discs using only one hand. Each disc 26 carried by the case 20 is supported on a tray 22 that automatically ejects from an opening 24 in the case 20 when it is freed from a locked position retracted within the case.

Figures 1, 2:
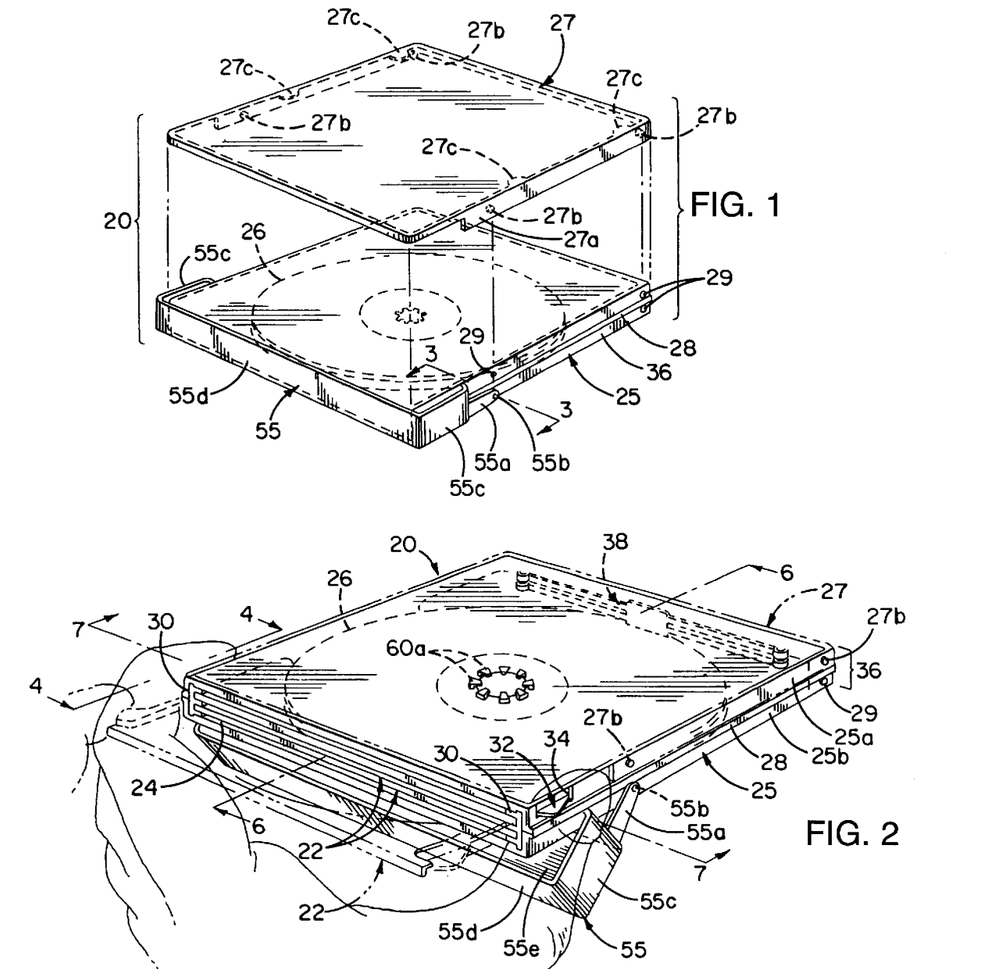
FIG. 1 is a perspective view of a compact disc storage case according to the present invention, with a transparent top cover elevated from the case.
FIG. 2 is a perspective view of the compact disc storage case of FIG. 1, showing a flip top of the case in an open position for exposing an open end for receiving a tray that holds a compact disc.

A clear plastic cover 27 snap fits over the case 20 and serves as an envelope for advertising or documentation. The cover 27 as best seen in FIG. 1 includes an apron 27a with several inwardly extending pins 27b that mate with recesses 29 in the sidewalls of the case 20 to form detents to snap fit the transparent cover onto the case. The plastic cover 27 also includes a series of tabs 27c for retaining and framing documents.

Figure 11A:
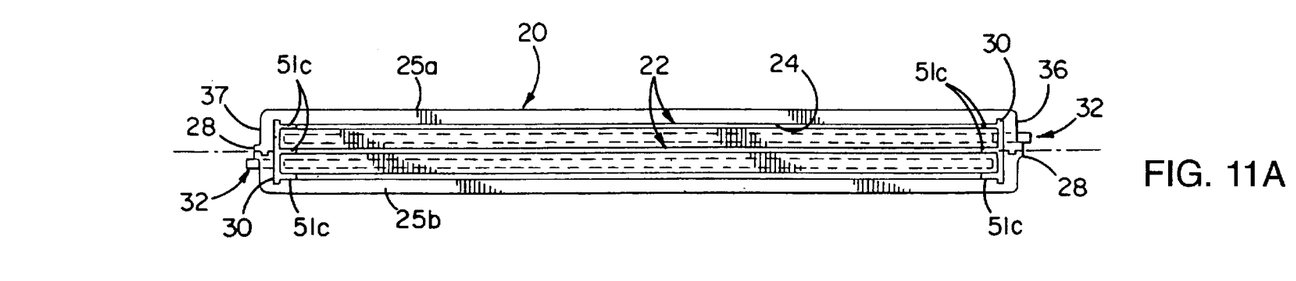
FIGS. 11A, 11B and 11C are end views of alternative embodiments of the case according to the invention for storing two, four and six compact discs, respectively.
Figure 11B:
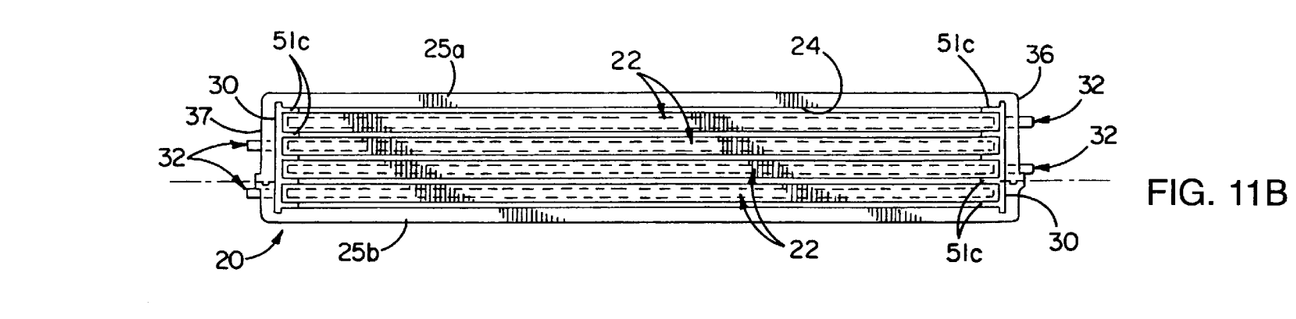
Figure 11C:
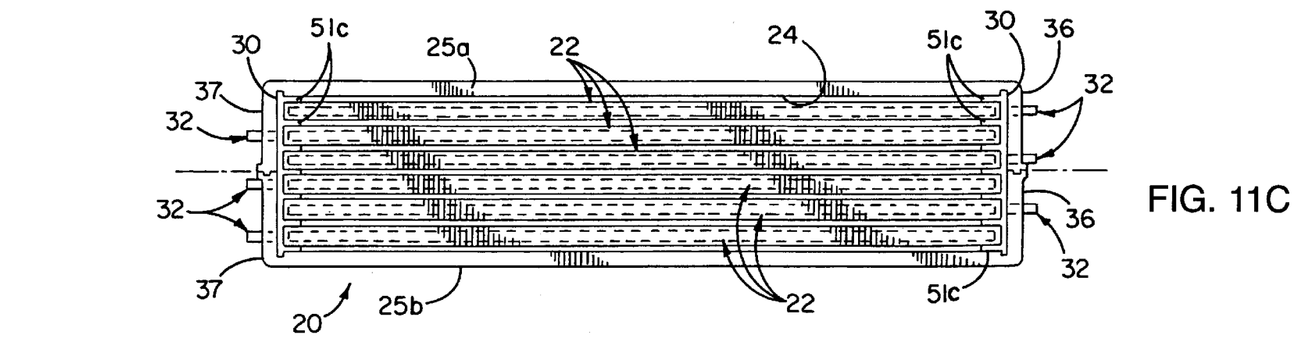

The molded plastic body 25 of the case 20 comprises top and bottom portions 25a and 25b, respectively, that are secured together about a seam at a rib 28. Support tracks 30 for the trays 22 are inserted into the top and bottom portions 25a and 25b prior to their being joined at the rib 28. For economical production, the top and bottom portions 25a and 25b are identically formed. Each of the portions 25a or 25b may be formed to hold one or three trays 22. By selecting different top and bottom portions 25a and 25b, the body 25 can be formed to receive two, four or six trays 22 as illustrated in FIGS. 11a, 11b and 11c, respectively, the particular number of trays depending upon the combination selected for the top and bottom portions of the body.

According to one important feature of the invention, the tray 22 is freed from its locked and retracted position using one hand by pressing a finger 31 of a latch mechanism 32 laterally disposed on the case 20. When the tray 22 is ejected, it extends from the opening 24 in a cantilevered manner as generally indicated by phantom lines in FIGS. 2, 4 and 8. From its ejected position, the tray exposes the disc 26 for easy removal. Because of the small diameter of the disc 26 (i.e., 5½ inches), most users can use one hand to pick up the disc from the ejected tray and insert it into an optical reader (not shown). In the optical reader, a tightly focused laser beam senses the optical reflectivity of the disc 22 as the disc is rotated about its axis. Variances in the reflectivity are converted to electrical data and processed by circuitry associated with the reader to perform a desired function—e.g., play music or run an application for an operating system of a personal computer. The storage case 20 of the invention affords the same protection of a jewel box with the added convenience of easy use—i.e., they protect against scratching or pitting of the information-carrying surface.

For positively securing the trays 22 within the body 25, each tray is formed with at least one integrally molded, laterally moveable latch mechanism 32. In its secured position, the latch mechanism 32 is mated or registered with a slot 34 in the side wall 36 of the body 25. The tray 22 is spring loaded in its retracted and secured position. Upon depression of the finger 31 of the latch mechanism 32 from the retaining slot 34 in the body 25, the tray 22 is automatically ejected by the spring action.

The spring action is provided by a leaf spring 38, which is also preferably molded from plastic and disposed at the rearward end of the tray 22. When the tray 22 is in its retracted position and locked by the latch mechanism 32, the leaf spring 38 is tensioned against a back sidewall 40 of the body 25. Hence, upon depression of the finger 31 of the latch mechanism 32, the leaf spring 38 is free to release its tension and thus automatically force the tray 22 in an ejecting fashion outwardly of the body 25.

Figure 5:
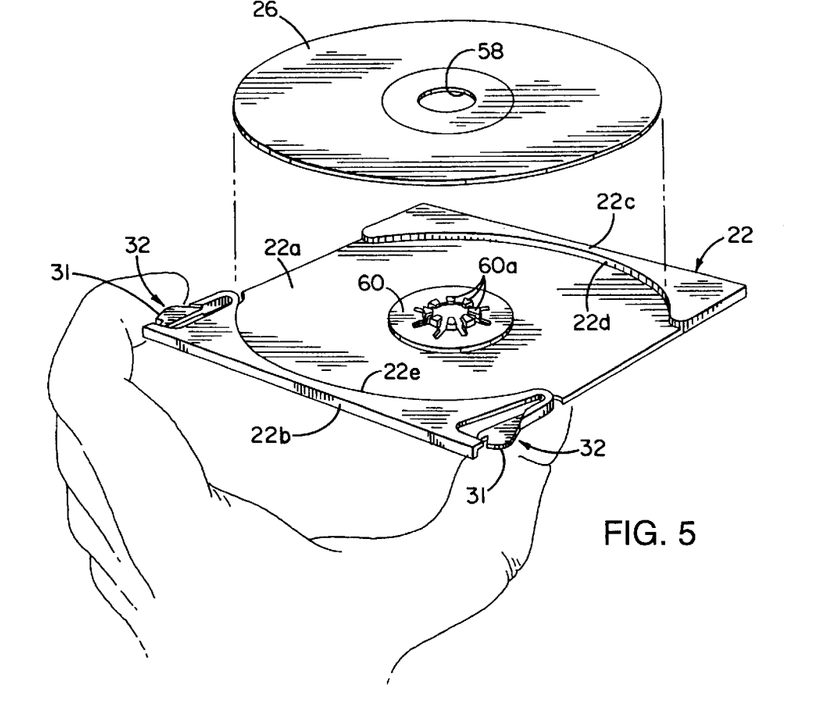
FIG. 5 is a perspective view of a tray housed by the case, which receives a compact disc in a nested arrangement.
Figure 7:
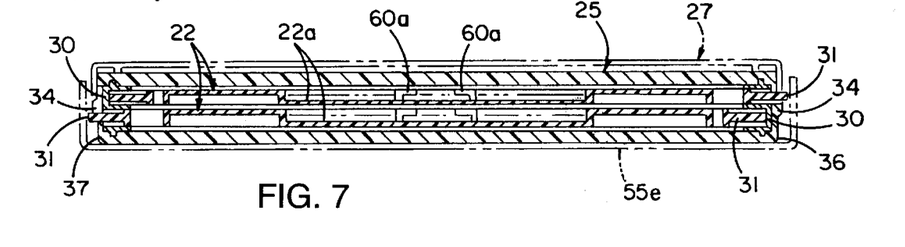
FIG. 7 is a cross-sectional view of the compact disc storage case taken in the plane of line 7—7 in FIG. 2.

Each tray 22 includes two opposing latch mechanisms 32 as best illustrated in FIG. 5. Preferably, only one of these latch mechanisms 32 mates with a slot 34 in one of the sidewalls 36 or 37. In this way, the location of the finger 31 for ejecting a tray 22 alternates from one side to the other for successively stacked trays 22 as best shown in FIG. 7.

Figure 9:
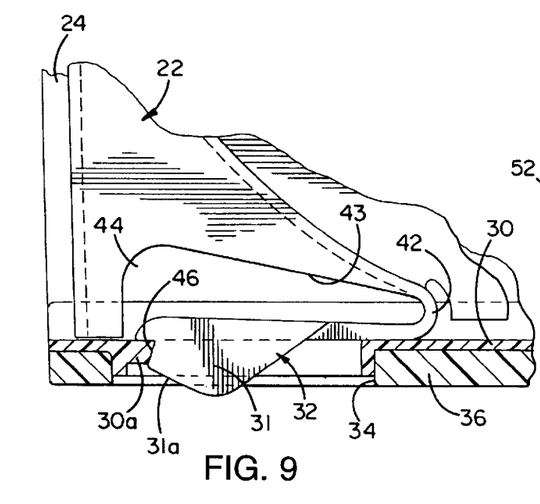
FIG. 9 is an enlarged fragmentary section of the tray, showing a latching mechanism for retaining the tray in a locked and retraced position.

Since one of the latching mechanisms 32 is the mirror image of the other, only one of the latching mechanisms will be described in detail with reference to FIG. 9. Each of the latching mechanisms 32 includes a flexible finger 31 that is an integral part of the tray 22 and flexes in the plane of the tray. An elbow 42 of the finger 31 is formed by an extension of the tray 22 that is curved about a radius. The extension continues from the elbow 42 to form the finger 31. In order to accommodate the flexing of the finger 31 in the plane of the tray 22, the tray includes a lateral recess 43 that forms a margin 44 between the finger and the edge of the tray.

In order to positively lock the tray 22 in its retracted position with tension loaded into the leaf spring 38, the finger 31 includes a notch 46 at its distal end that engages with a wall 30a of the track 30 that extends into the slot 34 in the sidewall of the body 25. When a force is applied to finger 31 in the direction indicated by the arrow in FIG. 8, the finger 31 flexes inwardly into the margin 44 created by the lateral recess 43 in the tray 22. As the finger 31 flexes, its tapered surface 31a engages the wall 30a of the track 30 extending into the slot 34. The tension of the spring 38 applies a force to the tapered surface 31a when it engages the outwardly extending wall 30a of the track 30, resulting in a force tending to flex the finger 31 inwardly. Thus, once the notch 46 has been disengaged from the wall 30a, the finger 31 moves inwardly relatively easily until the finger is fully flexed into the margin 44, which frees the tray 22 to eject in response to the tension loaded into the spring 38.

Figure 8:
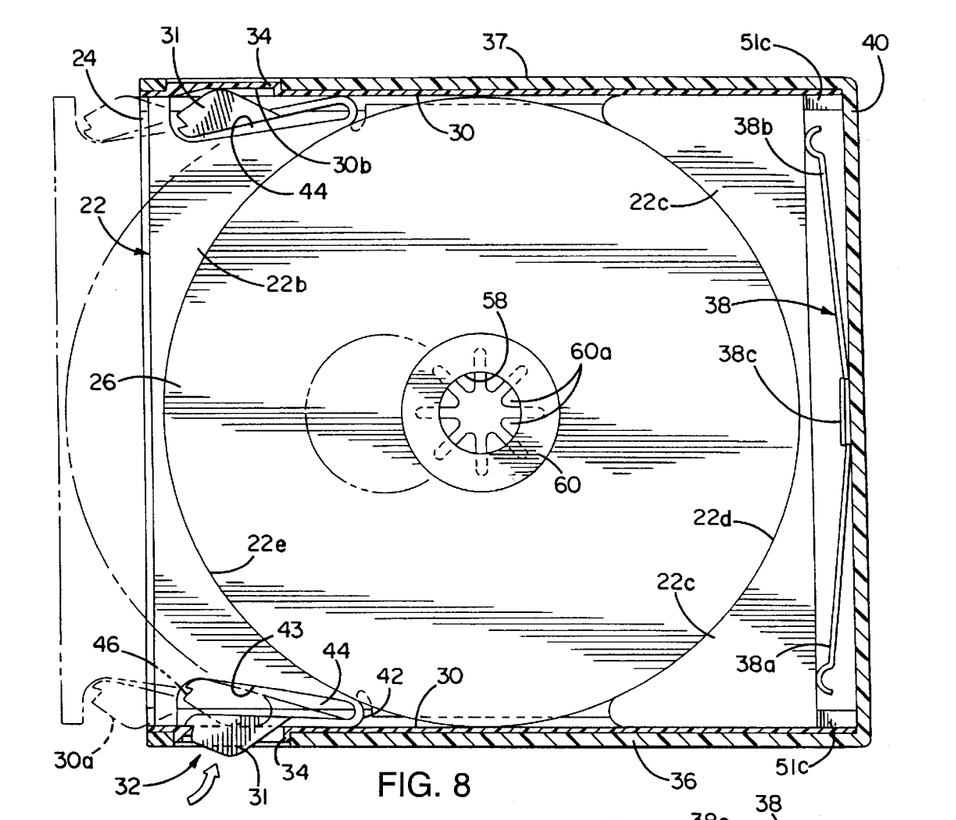
FIG. 8 is a cross-sectional plan view of the compact disc storage case taken in the plane of line 8—8 in FIG. 6.

For each tray 22, the fingers 31 of the two latch mechanisms 32 flex inwardly along the plane of the tray when the tray is pushed into the retracted position within the body 25 of the case 20. Because only one of the sidewalls 36 and 37 includes a slot 34 in the plane of the tray 22, only one of the fingers 31 mates with a slot 34 to lock the tray in its retracted position. The finger 31 of the other latch mechanism 32 simply remains biased against the recessed inner surface 30b of the track 30 as best seen in FIG. 8.

By providing latch mechanisms 32 on both sides of the tray 22, a single mold can be used for all of the trays regardless of the position of the tray in the body 20. By alternating the location of the aperture to mate with the finger 31 of one of the latch mechanisms 32 from one side of the case 20 to the other for each adjacent tray 22, a user is easily able to locate the latch mechanism for a desired tray in the closely stacked configuration provided by the case 20. Because the trays 22 include latch mechanisms 32 on both of their sides, they can be freely repositioned in the stack.

Mounted on the inside surfaces of sidewalls 36 and 37 of the body 25 are tracks 30 that support the trays 22 and allow them to be guided into the body and ejected from it in a controlled manner. The tracks 30 provide vertical spacing for the stacked trays 22 so that each tray is spaced from the trays immediately above and below it. The tracks 30 are laid in each body portions 25a and 25b prior to welding the two portions together. To assemble a storage case 20, a body portion 25a or 25b is first selected of an appropriate size (i.e., accommodating one or three compact discs). The tracks 30 are then laid on the opposite inner sidewalls 36 and 37 of the body portion and the leaf spring 36 is positioned against the inner surface of the back wall 40 of the body portion. The body portion 25a or 25b is then mated with a complementary portion and welded at the seam along the rib 28 to form the case 20. The trays 22 are then inserted into the opening 24 of the case 20 along the tracks 30.

Figure 3:
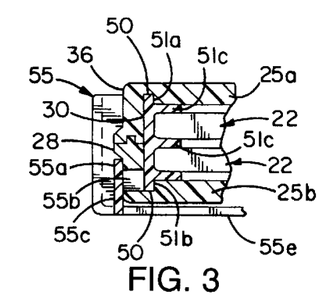
FIG. 3 is an enlarged cross-sectional view of the compact disc storage case taken in the plane of line 3—3 of FIG. 1.

In order to receive one of the tracks 30, each portion 25a and 25b of the body 25 includes a groove 50 formed into the floor of the portion where it meets the inner surface of one of the sidewalls 36 and 37. Each of the tracks 30 includes a pair of locating ribs 51a and 51b oppositely disposed on the top and bottoms of the tracks for mating with opposing grooves 50 in mated top and bottom body portions 25a and 25b as best illustrated in FIG. 3. When the two body portions 25a and 25b are mated, the ribs 51a and 51b prevent the tracks 30 from moving laterally across the cavity of the case 20. To prevent the tracks 30 from sliding outwardly along the length of the mating grooves 50, the walls 30a and 30b of the track extends inwardly into the slot 34 of the body, which provides a detent for retaining the track. Each of the tracks 30 have spaced apart rail members 51c for supporting the trays 22.

Figure 10:
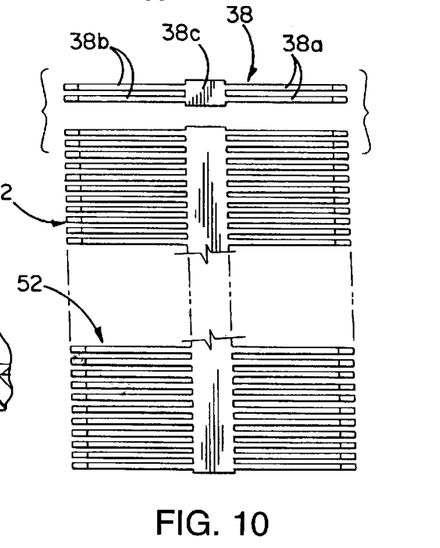
FIG. 10 is a plan view of a ribbon of leaf springs, selected ones of which are incorporated into the case for use in ejecting a tray when it is selected by a user.

Before the two body portions 25a and 25b are joined, the leaf spring 38 is secured to the inside surface of the back wall 40. The leaf spring 38 has two arms 38a and 38b extending from a base section 38c secured to the inside surface of the back wall 40. Preferably, the leaf spring 38 is formed as a ribbon of springs 52 as illustrated by FIG. 10 with the solid base section 38c scored (not shown) so that the spring 38 can be broken off from the ribbon in pairs for the embodiment illustrated in FIGS. 1–8 or in groups of four or six in order to accommodate other configurations of the casing 20 as illustrated in FIGS. 11b and 11c.

In assembling the case 20, body portions 25a and 25b are first selected. In the embodiment illustrated in FIGS. 1–8, both of the body portions 25a and 25b are single tray portions. The top and bottom body portions 25a and 25b are formed from the same mold. Mating these two portions creates a body for receiving two trays 22 as illustrated.

In keeping with the invention, each of the body portions 25a or 25b can be selected from one of two alternative configurations. One configuration provides storage for a single tray 22. The second configuration provides storage for three trays 22. By mating different configurations of the top and bottom portions 25a and 25b, respectively, the body 25 forms a casing 20 that can hold two, four or six trays 22 as previously mentioned. FIGS. 11A–11C illustrate a two, four and six pack configurations, respectively, for the case 20.

In FIG. 11A, two single tray configurations of the body portions 25a and 25b are mated, which creates the two-pack case 20 of FIGS. 1–8. In keeping with the invention, the latch mechanisms 32 for the two trays 22 extend from opposite sides of the case 20.

In FIG. 11B, a top portion 25a of the body 25 is a three-tray configuration and the bottom portion 25b is a single tray configuration of FIG. 11A. The three-tray configuration of the top portion 25a is the same as the single tray configuration except with deeper sidewalls 36 and 37 to accommodate three trays 22 instead of only one. When the two body portions 25a and 25b are mated, the resulting body 25 forms a four-pack case 20. The location of the latch mechanism 32 for each of the trays 22 alternates from one sidewall of the body 25 to the other in keeping with the invention.

In the case of FIG. 11C, the top and bottom portions 25a and 25b are each formed from the three-tray configuration. Thus, when the top and bottom portions 25a and 25b in FIG. 11C are mated, they form a six-pack case. Like the two and four-pack embodiments of the case in FIGS. 11A and 11B, respectively, the six-pack embodiment in FIG. 11C provides for the location of the latch mechanism 32 to alternate from one side to the other.

As can be seen from the three different cases in FIGS. 11A–11C, the invention contemplates providing two alternate configurations for each of the body portions 25a and 25b, which allows the invention to be realized in three alternative embodiments as illustrated in FIGS. 11A–11C. It will be appreciated by those skilled in the art that additional or substitute configurations for each of the body portions 25a and 25b may be realized for the purpose of providing additional embodiments. For example, a configuration of the body portion accommodating two trays would allow for a three-pack and five-pack case 20.

Figure 4:
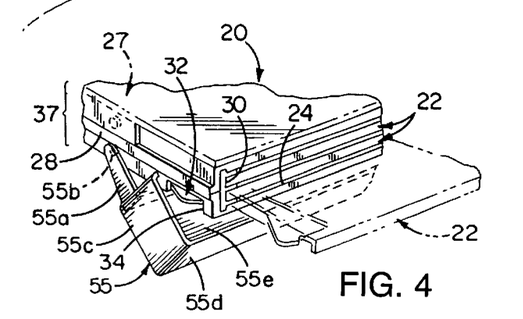
FIG. 4 is a fragmentary view of the compact disc storage case of FIGS. 1–3, showing the side of the case hidden from view in FIGS. 1 and 2.
Figure 6:
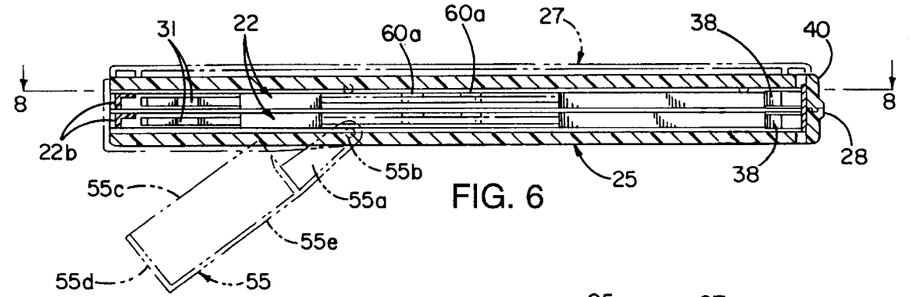
FIG. 6 is a cross-sectional view of the compact disc storage case taken in the plane of line 6—6 in FIG. 2, showing the flip top in its open position.

In order to protect the compact discs 26 in the case 20, a protective cover 55 is provided to close over the opening 24. The protective cover 55 pivots downwardly to expose the opening 24 of the case 20 as best illustrated in FIGS. 2, 4 and 6. Each of the side arms 55a of the cover 55 includes a pin 55b that mates with one of the recesses 29 in the sidewalls of the body 25 in order to form a pivot. The inner surface of the side arms 55a are spaced to provide an interference fit with the outer surface of the sidewalls 36 and 37. When the cover 55 is rotated into its closed position as illustrated in FIG. 1, the interference fit of the side arms 55a and the sidewalls 36 and 37 retains the cover in its closed position. Also, the rib 28 between the top and bottom portions 25a and 25b of the body 25 defines a stop that limits the rotation of the cover 44 and provides a means to correctly register the cover in its closed position.

Each of the side arms 55a includes a portion 55c that extends laterally about a radius in order to accommodate the one or more fingers 31 projecting from the sidewalls 36 and 37 of the body 25. A front wall 55d of the cover 55 masks the opening 24 of the body 25 and a bottom wall 55e provides additional protection while also functioning as a stop for limiting the rotational movement of the cover. In keeping with the invention, the cover can be easily rotated downwardly with one hand in order to expose the opening 24 and the fingers 31 of the latch mechanisms 32.

In operation, the protective cover 55 is first rotated downwardly to expose the opening 24 of the case 20. To remove a disc 26, the thumb and index fingers are used to press the finger 31 of the latch mechanism 32 on the sidewall 36 of the casing 20 as illustrated in FIG. 2. Pressing the finger 31 allows the tension in the leaf spring 38 to be released and the tray 22 ejected. The ejected tray 22 is free to slide in the tracks 30. Thus, a single hand can grab the leading portion of the ejected tray 22 and slide it outwardly from the case 20 to fully expose the disc 26. The disc 26 can then be easily removed from the tray 22 using only one hand.

In order to retain the compact disc 26 in the tray, a circular hole 58 in the center of the disc is mated with a central hub 60 of the tray 22. In a fashion that is conventional in jewel boxes, the compact disc 26 is pressed onto the central hub 60, which has resilient fingers 60a compressed by the circular hole 58 of the disc. The hub 60 then grips the compact disc 26 and holds it in place on the tray 22.

The tray 22 is substantially flat and square shaped. Its top surface is contoured to define a central recess 22a bordered by front and back ridges 22b and 22c, respectively. Transitions 22d and 22e between the recess 22a and the ridges 22b and 22c are arcuate in shape in order to complement and follow the shape of the disc 26. The disc 26 is supported by the recess 22a and is bordered by the ridges 22b and 22c to form a nested arrangement. The front and back ridges 22b and 22c are undercut as best illustrated in FIG. 7 in order to minimize the mass of the tray 22.

Each of the trays 22 spans the tracks 30 and is supported at each track by a rail 51c. Each tray 22 freely slides along the rail 51c such that the tray can be completely removed from the case 20 or it can be fully retracted into the case, in which case the latch mechanism 32 locks the tray in its fully retracted position.

Figure 12:
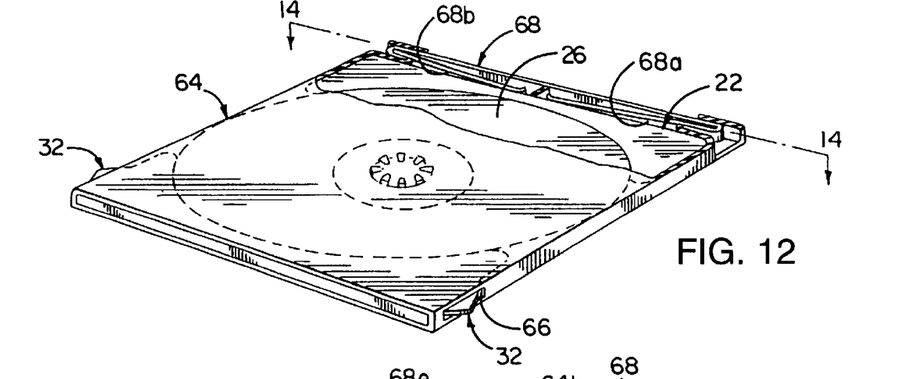
FIG. 12 is an alternative embodiment of the compact disc storage case according to the invention, which stores a single compact disc.
Figure 13:
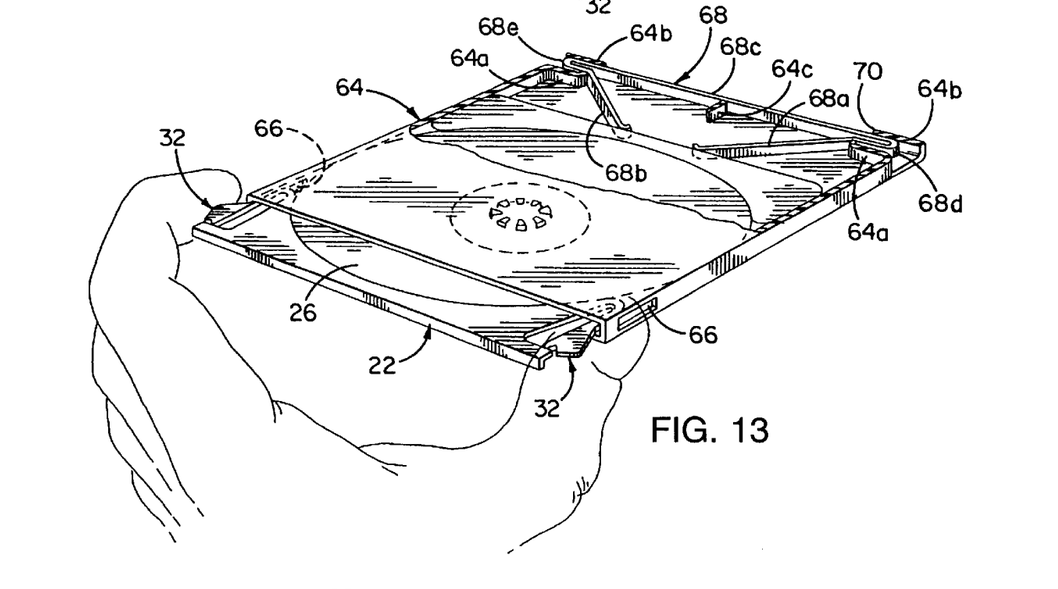
FIG. 13 is a perspective view of the embodiment of the case illustrated in FIG. 12, with the tray partially ejected.
Figure 14:
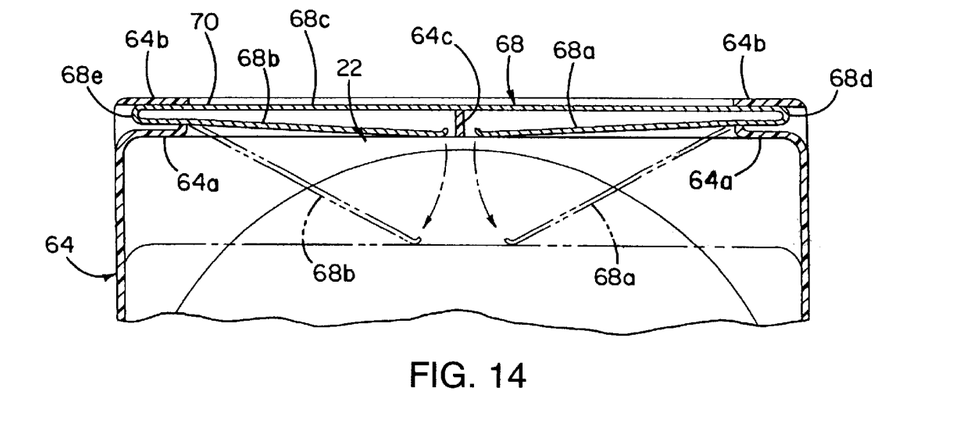
FIG. 14 is a fragmentary plan view taken in the plane of line 14—14 in FIG. 12, showing the leaf spring biased against an end of the tray such that the spring imparts a force to the tray tending to eject it from the case.

In addition to embodiments of the invention in which several compact discs 26 are stored, the invention also contemplates an embodiment in which a single disc is stored. FIGS. 12–14 illustrate an embodiment of the invention in which a single disc 26 is stored in a case 64 in keeping with the invention. As illustrated in FIGS. 12–14, the tray 22 is the same as the tray 22 of the embodiment illustrated in FIGS. 1–11. Preferably, the case 64 is formed as one piece. Tracks such as the tracks 30 in the embodiment in FIGS. 1–11 are not required because only a single tray 22 is received by the case 64. Both of the latch mechanisms 32 of the tray 22, however, are engaged by mating slots 66 in the case 64.

In this single tray embodiment, a leaf spring 68 for ejecting the tray 22 is configured differently than the leaf spring 38 in the embodiment of FIGS. 1–11. The leaf spring 68 in the embodiment of FIGS. 12–14 has two arms 68a and 68b extending from an elongated portion 68c that spans an open back wall 70 of the case 64. The spring 68 is retained in the case 64 at two hairpin bends 68d and 68e formed at the ends of the elongated member of the spring 68. Each of the hairpin bends 68d and 68e is received by a slot formed by two opposing walls 64a and 64b. A tab 64c provides stability to the spring 68 when tension is loaded into it and released from it.

Figure 15:
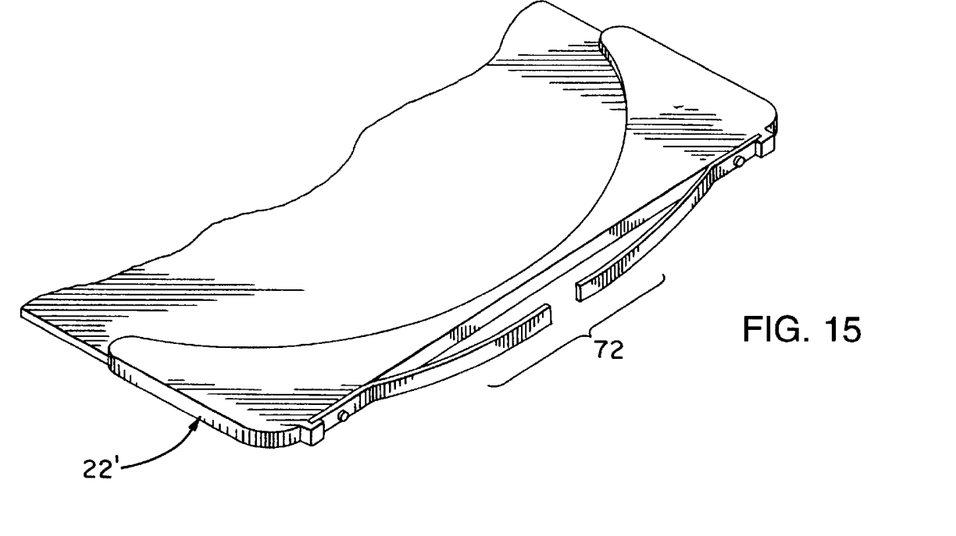
FIG. 15 is a fragmentary perspective view of the tray for the case of FIG. 12, showing an alternative embodiment of the leaf spring.
Figure 16:
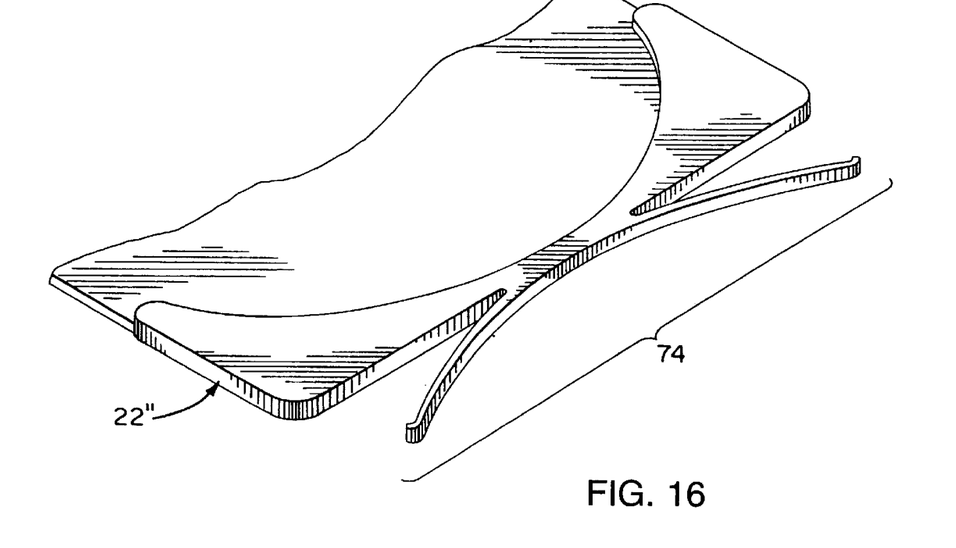
FIG. 16 is a fragmentary perspective view of the tray for the container of FIG. 12, showing a further alternative embodiment for the leaf spring.

FIGS. 15 and 16 illustrate alternative embodiments for a leaf spring that is secured to the back of the tray in contrast to the leaf springs of the embodiments of FIGS. 1–11 and 12–14, which are secured to the case. In FIG. 15, a leaf spring 72 is separately formed and then attached to the tray 22. In FIG. 16, a leaf spring 74 is formed as an integral part of the tray 22".

In keeping with the invention, a case for two compact discs has approximately the same thickness as a single jewel case. Therefore, in the same space a jewel case holds one compact disc whereas the invention holds two. As the size of the case is increased to hold more compact discs, the space saving increases geometrically; that is, the more discs the case accommodates, the more space it saves relative to stacked conventional jewel cases. For example, a six-pack version of the case according to the invention is approximately 35 percent of the size of six stacked jewel cases. A larger case according to the invention that accommodates 24 compact discs is approximately seven inches tall whereas 24 jewel cases stack to a height of approximately 30 inches.

To the further advantage of the space savings offered by the invention, a further contemplated embodiment of the invention provides storage for a large collection of compact discs 26 in a case intended to be only quasi portable. Such a further alternative embodiment of the invention is illustrated in FIGS. 17–20, which is a 24-pack case 76 that is well suited for providing permanent storage for a number of compact discs 26. By color coding the face of the case 76, discs of different categories (e.g., audio, video, data) can be segregated for easy access. For example, the trays 22 can be formed from three different colored plastic. Each color may designate audio, video or data discs. Preferably, all of the discs of the same color are placed into the stack provided by the case in a contiguous arrangement so that the front of the case appears in three blocks of colors. Alternatively, color coded indicia can be added to the side of the casing using add-on labels or the like.

In the embodiment of FIGS. 17–20, the case 76 is constructed of top and bottom portions 78 and 80, respectively, and separate sidewalls 82 and 84 and a back wall 86. Tracks 85 for the trays are integrally formed into the sidewalls 82 and 84. The trays are the same as the trays 22 in the embodiments of FIGS. 1–11 and 12–14.

Figure 19:
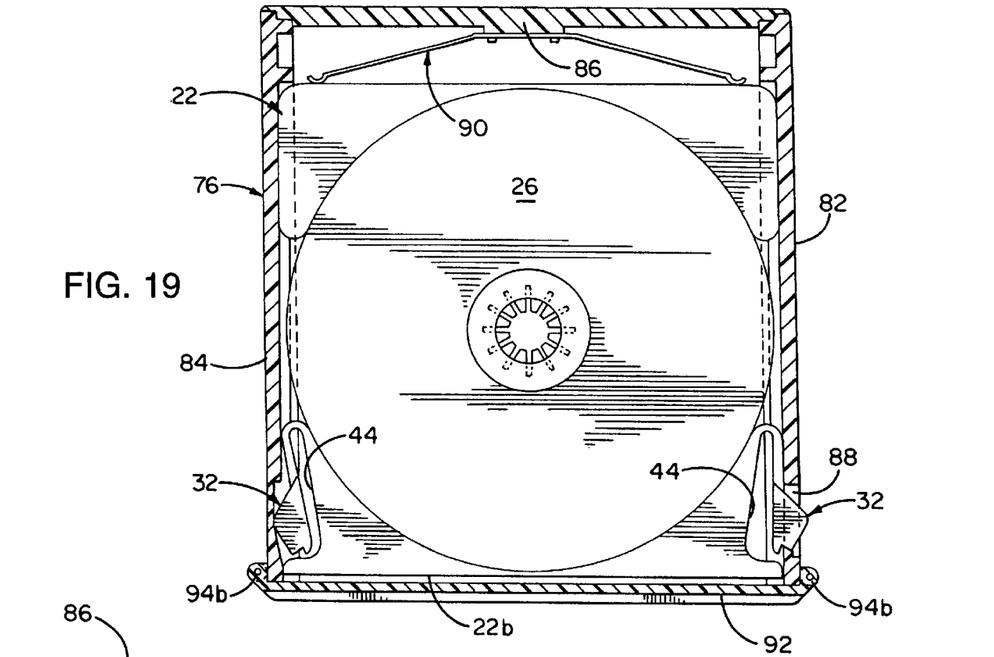
FIG. 19 is a cross-sectional plan view taken in the plane of line 19—19 of FIG. 17, showing the tray in its fully retracted position.
Figure 20:
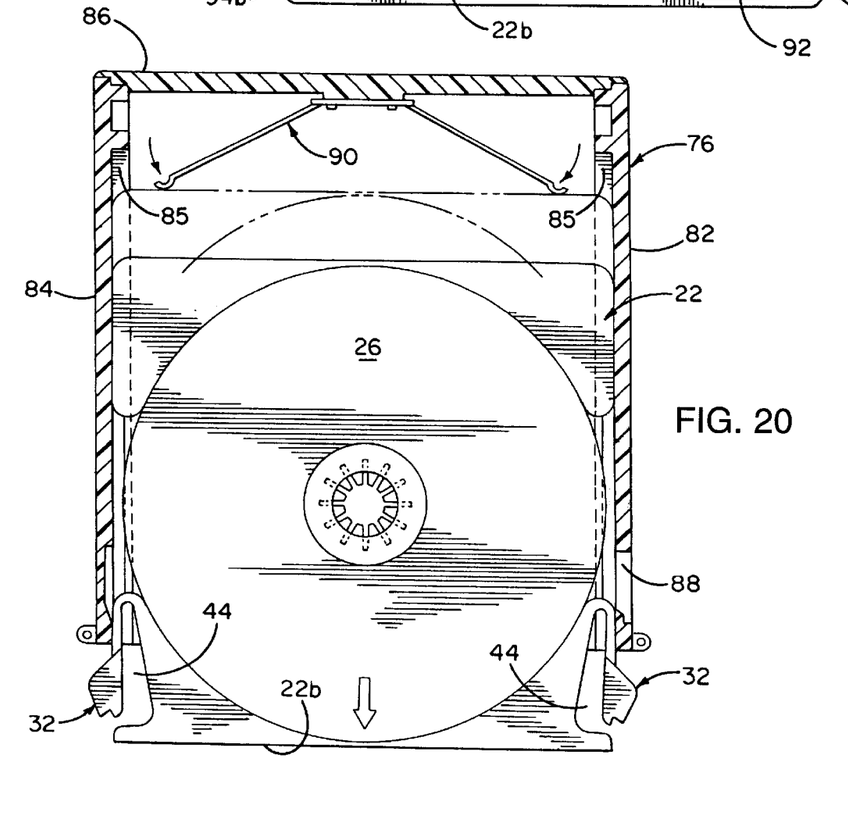
FIG. 20 is a cross-sectional plan view taken in the plane of line 20—20 of FIG. 18, showing the tray in a partially ejected position.

Like the embodiment of FIGS. 1–11, slots 88 are located on each of the sidewalls 82 and 84 to provide detents when mated with the latching mechanism 32 of the tray 22. The slots 88 alternate their locations from one side of the case 76 to the other. A leaf spring 90 mounted to the back wall 86 of the case 76 engages the tray 22 in the same manner as the leaf spring 38 in the embodiment of FIGS. 1–11. As indicated in FIGS. 19 and 20, when the latch mechanism 32 is flexed inwardly into the margin 44 provided by the lateral recess 43 in the tray 22, the tension in the spring 90 is released and the tray ejected outwardly from the case 76 as indicated by the arrow in FIG. 20.

Figure 17:
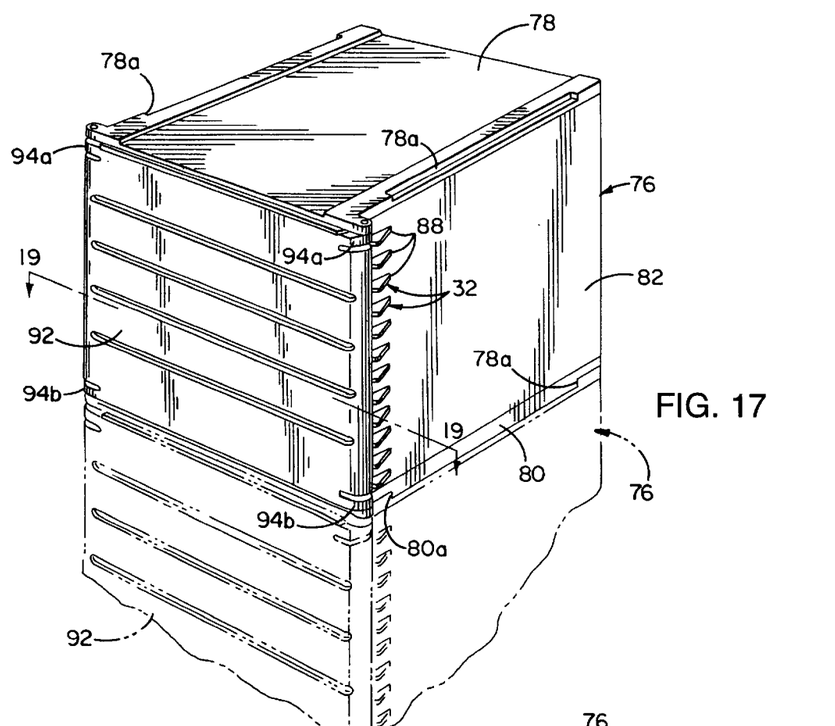
FIG. 17 is a perspective view of another alternative embodiment of the compact disc storage case according to the invention, wherein the case is intended to store a collection of compact discs.
Figure 18:
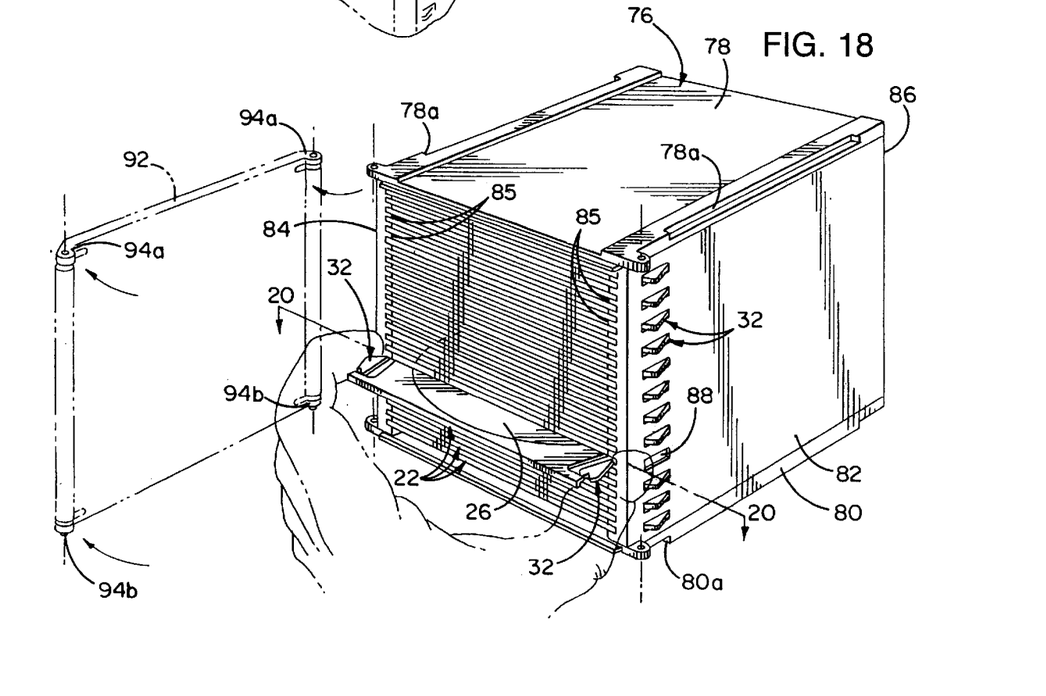
FIG. 18 is of the compact disc storage case of FIG. 17 with a transparent cover removed and one of the trays partially ejected.

Finally, the top and bottom portions 78 and 80 of the case 76 are shaped to have recessed areas 78a and ridged areas 80a that complement one another such that a case can be stacked onto another case in a nested arrangement which retains the two mated cases in a stacked alignment as illustrated by phantom lines in FIG. 17. In order to protect the discs 26, a transparent cover 92 is provided that is pivotally mounted to the case by two pairs of hinge assemblies 94a and 94b.

In view of the above, a case for an optical compact disc has been described which provides compact storage in a robust construction that lends itself to economical manufacture.

Each of the illustrated embodiments for the case provide a construction that allows the user to access a disc using only one hand. In the embodiment of FIGS. 1–8, several discs 26 can be stored in a compact manner that is easily transportable. In the embodiment of FIGS. 12–14, a single disc 26 is contained in a sleeve-like case that affords substantial protection to the disc while allowing for easy access. The substantial space savings offered by the invention is best realized in a stacked arrangement for a number of trays 22 as illustrated in the embodiment of FIGS. 17–20 for a permanent storage site.

Figure 21:
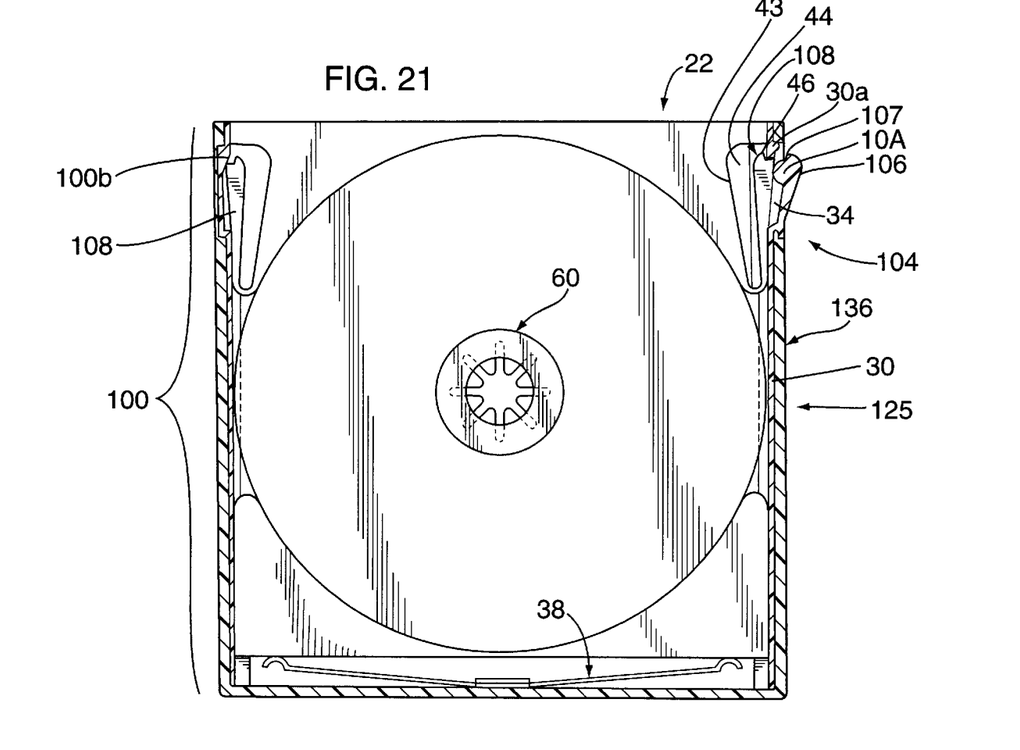
FIG. 21 is a top view of the compact optical disc case with the button for releasing the tray located on the storage case.
Figures 22, 23:
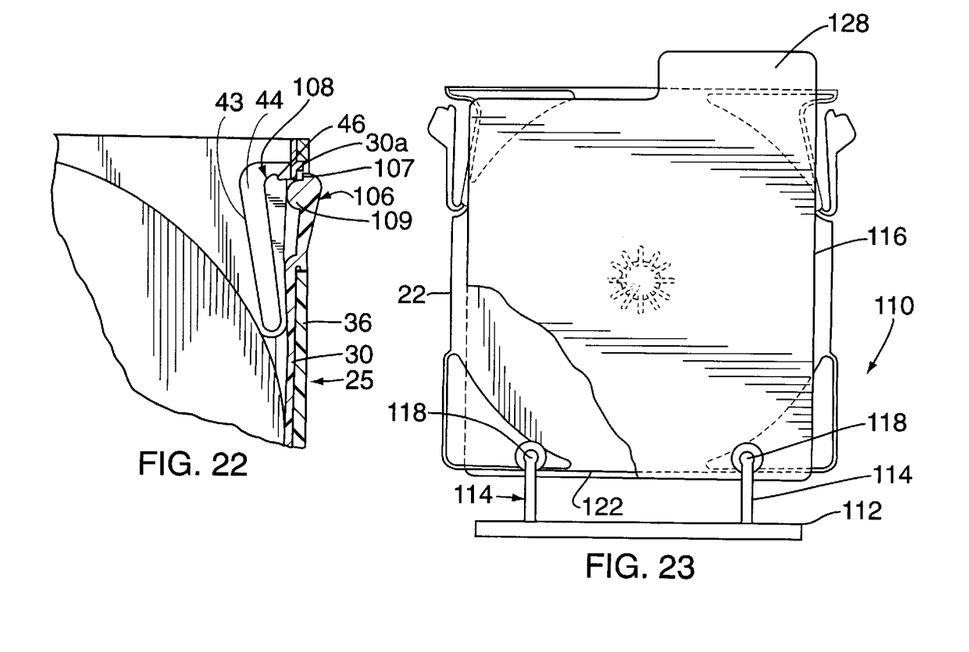
FIG. 22 is an enlarged fragmentary section of the tray locking mechanism of the compact optical disc storage case shown in FIG. 21.
FIG. 23 is front view of a compact optical disc storage system according to the present invention.

Referring to FIGS. 21–22, another embodiment of the storage case, generally designated 100, for compact optical discs, is shown. In this embodiment, the release button 106 of the latch mechanism 104 is formed as an integral part of the side wall 36 of the body portion 25 of the case 100, and flexes in the plane of the tray 22. The distal end of the release button 106 has a shoulder 107 for engaging the wall 30a for limiting inward movement of the button 106. The distal end of the release button 106 also has an inwardly projecting member 109 for engaging and pushing the finger 108 inwardly into the recess 43 (as shown in FIG. 22).

In order to positively lock the tray 22 in its retracted position with tension loaded into the leaf spring 38, the finger 108 includes a notch 46 at its distal end that engages the wall 30a of the track 30 (as shown in FIG. 22) enabling the finger 108 to resist the tension of the leaf spring 38 and prevent expulsion of the tray 22 from the case 100. When a force is applied to release button 106 in the direction indicated by the arrow in FIG. 21, the release button 106 flexes inwardly permitting the member 109 to engage and flex the finger 108 inwardly into the margin 44 created by the lateral recess 43 in the tray 22. Once the notch 46 has been disengaged from the side wall 36, the tray 22 ejects in response to the tension loaded into the spring 38. In the embodiment shown in FIG. 21, only one release button 106 is utilized to prevent expulsion of the tray 22 from the case 100, but it will be appreciated that a second release button 106 and the cooperating finger 108 may be used as shown in the previous embodiments. Referring to FIG. 21, it will be seen that the body of the case 100 may have an arcuate shaped wall 100b for guiding the left finger 108 into and out of the case while preventing the left finger 108 from interfering with the operation of the tray.

Figure 24:
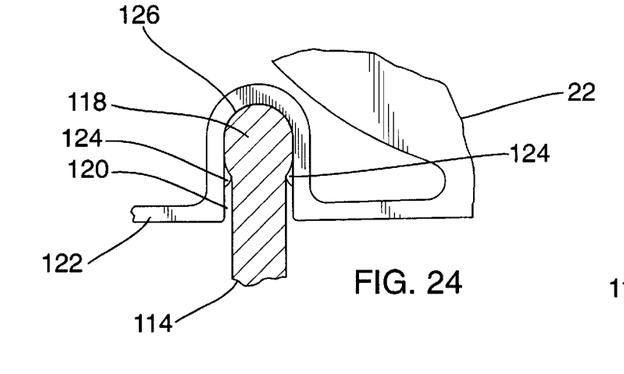
FIG. 24 is an enlarged fragmentary section of the compact optical disc storage system depicted in FIG. 23, showing the compact optical disc tray engaging the storage system base.
Figure 25:
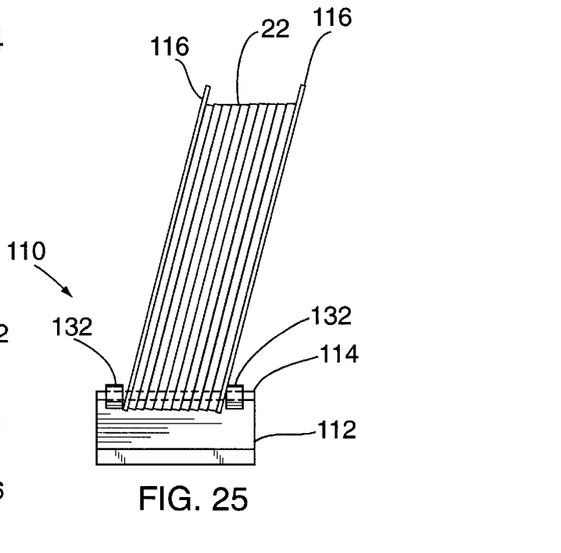
FIG. 25 is a side view of the compact optical disc storage system depicted in FIG. 24.

Referring to FIGS. 23–25, there is shown a display system 110 in accordance with the present invention for holding and displaying trays 22 in a fashion similar to a card file. The storage system 110 comprises a base 112 having at least one and preferably two rails 114 projecting upwardly for engaging and holding a plurality of trays 22 and divider sheets 116.

As best shown in FIG. 24, the tips 118 of the rails 114 have a cross-section configured to engage corresponding slots 120 disposed in the side 122 of the tray 22 in a press fit or snap fit arrangement for holding the tray 22 securely upon the rails 114, while still allowing the tray 22 to slide along the rails 114 and to pivot about an axis formed along the side 122 of the tray 22. The tip 118 has a generally circular shape which is wider than the body of the rail 114.

Each slot 120 in the tray 22 has a pair of inwardly projecting dimples 124 that form a generally circular aperture 126 for mating with the tip 118 of the rail 114. The distance between the dimples 124 is dimensioned to be slightly smaller than the circular tip 118 so as to releasably lock the circular tip 118 in the aperture 126 in an interference fit. The dimples 124 may be dimensioned to be slightly larger than the width of the rail body 114 for permitting the tray 22 to slide and slightly pivot along the longitudinal axis of the rail 114.

The storage system 110 may also have divider sheets having labeling tabs 128. The dividers 116 preferably have a generally rectangular shape and a plurality of slots 130 for engaging the rail 114 which functions in an identical manner as the tray slots 120. Blocks 132 may be attached to the rails 114 for providing additional support to maintain the trays 22 in an upright position. The tab 128 projects upwardly from the body so that labels disposed on the tab 128 may be read, when the divider 116 is interposed between the trays for separating the trays 22 in different sections. In keeping with the invention, it is contemplated that the base 112, trays 22 and divider sheets 116 may be formed of plastic, metallic or other compositions of materials.

Figure 26:
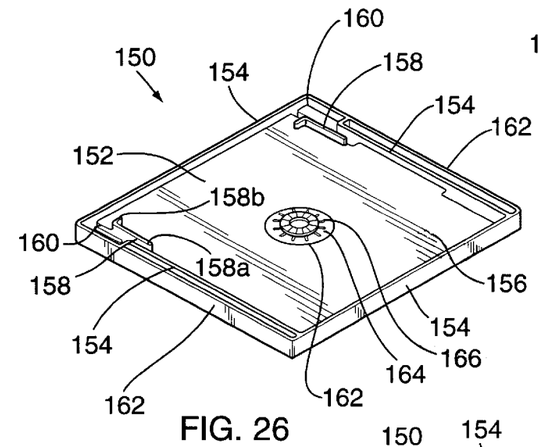
FIG. 26 is a perspective view of a compact optical disc shipping container according to the present invention shown with an optional recess for receiving a compact optical disc in a nested arrangement.
Figure 27:
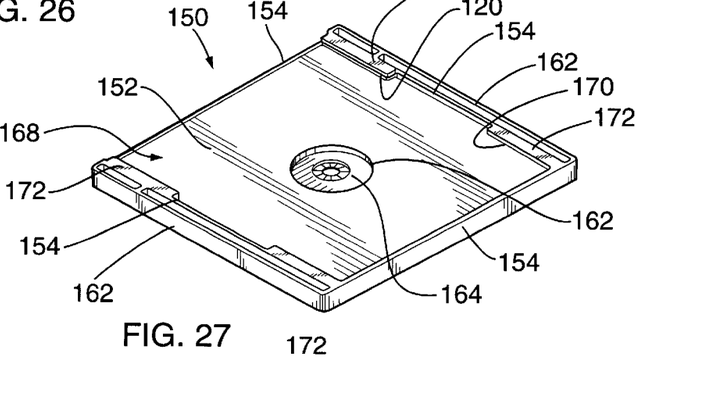
FIG. 27 is a perspective view of the bottom of the compact optical disc shipping container depicted in FIG. 26, showing four tabs for receiving an edge of a document.

Referring to FIGS. 26–27, there is shown a shipping container 150 for the trays 22 of the compact optical disc storage case 20. The container 150 has a base 152 and side walls 154 defining a generally rectangular front recess 156 for receiving the rectangular tray 22. The container 150 may also have an upwardly projecting retaining guide 159 integrally formed with the base 152 and spaced from the side walls 154 for mating with the corresponding margin 44 in the tray 22 and for properly positioning the tray 22 in the shipping container 150. The recess 156 also defines a margin 160 generally disposed in the corners of the shipping container 150 for receiving the finger 32, generally disposed outboard of the tray walls 30. In order to reinforce the shipping container 150, a plurality of reinforcing ribs 162 may be disposed adjacent the container walls 154.

In the illustrated embodiment, the two retaining guides 158 have an elongated body 158a with a curved end region 158b which are dimensioned to mate with the margins 44 of the tray 22 and to hold the tray 22 within the recess 156. In order to stack a plurality of trays 22 in the shipping container 150, the height of retaining guides 158 may be lengthened so that they extend through the corresponding margins 44 in the stacked adjacent trays 22.

In order to permit the shipping container 150 to optionally carry compact discs 26 in addition to the tray 22, the base 152 may have a centrally disposed aperture 162 adapted for receiving a plastic insert hub 164 in a press first manner as shown in FIG. 26. The hub 164 operates in a conventional manner such that the compact disc 26 is pressed onto the plurality of resilient fingers 166 and the fingers 166 grip and hold the compact disc 26 in place on the shipping container 150. Since the hub 164 is removable, the shipping container may also be used with a tray 22 after removal of the hub 164.

In accordance with another object of the invention, the shipping container 150 may have means for holding a document such as a label, instruction booklet and the like. As shown in FIG. 27, the rear of the container 150 may have a rear recess 168 defined by the base 152 and side walls 154, and a plurality of slots 170 defined between integrally formed tabs 172 projecting from the side walls 154 and the base 152. Slots 170 spaced on opposing sides of recess 168 cooperate to receive and hold the edge of the document such as cover labels, sales literature, instructions and the like within the recess 168.

Once the tray 22, the compact disc and documents are positioned within the container 150, the container 150 may be covered with plastic wrap to keep the trays 20, discs 26, or documents from falling out of the container 150 during shipping.

While this invention has been described with an emphasis upon the illustrated embodiments, it will be obvious to those with ordinary skill in the art that variations of the illustrated embodiments may be used and that it is intended that the invention may be practiced otherwise than as specifically described herein. Accordingly, this invention includes all modifications encompassed within the spirit and scope of the invention as defined by the following claims.

What is claimed is:

1. A storage case for a compact optical disc comprising a tray having a narrow profile, an edge and a recess in a flat planar top surface for receiving the compact optical disc in a nested engagement, a body having top and bottom portions joined by sidewalls that define an opening in the body for receiving the tray, a leaf spring interposed between the edge of the tray and an inner surface of the body such that the spring is fully loaded with tension when the tray is received by the opening of the body and guided into a retracted position in which the tray is within the body, a latch mechanism integrally formed at one side of the tray, a flexuous and elastic finger of the latch whose bending movement is in a plane parallel with the flat planar top surface of the tray, an aperture in the sidewall of the body for mating with the finger when the tray is fully retraced into the body, a bearing surface of the elastic finger extending through the aperture when the tray is in its fully retracted position and biasing against an opposing surface of the mated aperture to retain the tray in its retracted position with tension loaded in the leaf spring, and an indentation in the tray to provide a margin for the finger to flex inwardly in response to an external force, thus releasing the finger from the aperture and allowing the leaf spring to release its tension by ejecting the tray from the body.

2. A storage case for a compact optical disc comprising a tray having a narrow profile, an edge and a recess in a flat planar top surface for receiving the compact optical disc in a nested engagement, a body having top and bottom portions joined by sidewalls that define an opening in the body for receiving the tray, a leaf spring interposed the edge of the tray and an inner surface of the body such that the spring is fully loaded with tension when the tray is received by the opening of the body and guided into a retracted position in which the tray is within the body, a latch mechanism integrally formed on a side of the tray, a flexuous and elastic finger of the latch whose bending movement is in a plane parallel with the flat planar top surface of the tray, an aperture in the sidewall of the body for mating with the finger when the tray is fully retraced into the body, a release button integrally formed in the sidewall of the body for selectively engaging the finger in response to an external force, a bearing surface of the elastic finger extending through the aperture when the tray is in its fully retracted position and biasing against an opposing surface of the mated aperture to retain the tray in its retracted position with tension loaded in the leaf spring, and an indentation in the tray to provide a margin for the finger to flex inwardly in response to an external force on the release button, thus releasing the finger from the aperture and allowing the leaf spring to release its tension by ejecting the tray from the body.

3. The storage case of claim 2 wherein the latch mechanism is integrally formed on each of two opposing sides of the tray.

4. A display and storage system for a compact optical disc comprising:

a tray having a narrow profile, an edge and a recess in a flat planar top surface for receiving the compact optical disc in a nested engagement, a base having a first outwardly projecting rail for receiving and holding the tray, and means for releasably connecting the tray to the rail wherein an end of the rail has a tip and the edge of the tray has a first slot dimensioned to releasably engage the tip in a snap fit arrangement so that the rail displays and supports the tray in a generally upright manner.

5. The display and storage system as set forth in claim 4 wherein the base has a second outwardly projecting rail spaced for receiving and holding the tray spaced from the first rail, and the connecting means includes a tip at an end of the second rail and an edge of the tray has a second slot dimensioned to releasably engage the tip of the second rail in a snap fit arrangement so that the first and second rails display and support the tray in a generally upright manner.

6. The display and storage system as set forth in claim 5 wherein the first and second slot are defined by opposing walls and projecting dimples on each wall, and the first and second tips are configured to engage the projecting dimples in the respective first and second slots in a snap fit arrangement.

7. The display and storage system as set forth in claim 4 comprising a substantially flat divider sheet for dividing a plurality of trays into different sections, and means for connecting the divider sheet to the rail wherein an edge of the divider sheet has a first slot dimensioned to releasably engage the tip in a snap fit arrangement so that the rail may support the divider sheet in a generally upright manner between the trays.

8. A shipping container for a compact disc tray wherein the tray has a narrow profile, a planar surface and a recess in the planar surface of the tray for receiving a compact optical disc in a nested arrangement, a flexuous and elastic finger integrally formed on at least one side of the tray, and a corresponding indention in the tray to provide a margin for each finger to flex inwardly in response to an external force, the container comprising a flat planar surface having top and bottom sides and a perpendicular axis, a plurality of integral sidewalls projecting outwardly from the top side of the planar surface defining a body recess for receiving the tray wherein the sidewalls permit the tray to engage the recess along the perpendicular axis, an integral retaining guide projecting outwardly from the top side of the planar surface for mating with the indention in the tray for holding the tray in the recess.

9. The shipping container as set forth in claim 8 for a compact disc having a centrally disposed hole, the container further comprising an aperture in the top side for selectively receiving a hub insert, the hub insert having a plurality of flexuous fingers for holding the compact disc in the recess in response to snap fit engagement between the fingers and the disc hole.

10. The shipping container as set forth in claim 8 wherein the retaining guide protrudes from the top side of the planar surface of the shipping container for receiving a plurality of trays.

11. The shipping container as set forth in claim 8 comprising integral sidewalls projecting from the bottom side of the planar surface, a plurality of tabs projecting from the sidewalls and spaced from the bottom side for defining a slot for receiving and holding a document.

\* \* \* \* \*